United States Patent
Bozbey et al.

(10) Patent No.: US 12,488,229 B2
(45) Date of Patent: Dec. 2, 2025

(54) ARTIFICIAL SYNAPSE CIRCUIT

(71) Applicant: TOBB EKONOMI VE TEKNOLOJI UNIVERSITESI, Ankara (TR)

(72) Inventors: Ali Bozbey, Ankara (TR); Sasan Razmkhah, Chambery (FR)

( * ) Notice: Subject to any disclaimer, the term of this patent is extended or adjusted under 35 U.S.C. 154(b) by 560 days.

(21) Appl. No.: 18/000,553

(22) PCT Filed: Jun. 1, 2021

(86) PCT No.: PCT/TR2021/050524
§ 371 (c)(1),
(2) Date: Dec. 2, 2022

(87) PCT Pub. No.: WO2021/246990
PCT Pub. Date: Dec. 9, 2021

(65) Prior Publication Data
US 2023/0274131 A1 Aug. 31, 2023

(30) Foreign Application Priority Data
Jun. 2, 2020 (TR) .................................. 2020/08489

(51) Int. Cl.
G06N 3/065 (2023.01)
(52) U.S. Cl.
CPC ..................... G06N 3/065 (2023.01)
(58) Field of Classification Search
CPC ..................................... G06N 3/065
See application file for complete search history.

(56) References Cited

U.S. PATENT DOCUMENTS

2019/0207076 A1    7/2019  Schneider et al.

FOREIGN PATENT DOCUMENTS

CN    101364594 A    2/2009

OTHER PUBLICATIONS

International Search Report for corresponding PCT/TR2021/050524 dated Nov. 12, 2021.
Written Opinion of the International Searching Authority for corresponding PCT/TR2021/050524 dated Nov. 12, 2021.
Karamüftüoglu, M.A., "Design and Implementation of an Ultra High Speed and Low Energy Artificial Neuron", Dec. 2018, <http://earsiv.etu.edu.tr/xmlui/bitstream/handle/20.500.11851/2358/541577.pdf?sequence=1&isAllowed=y> [Translation of Abstract provided; see Written Opinion for description of relevance].

(Continued)

Primary Examiner — Grace Park
(74) Attorney, Agent, or Firm — Egbert, McDaniel & Swartz, PLLC

(57) ABSTRACT

Disclosed are two embodiments of an artificial synapse circuit that enable calculation of the weights in artificial neural networks. The first embodiment includes: a plurality of weighting circuits in which a plurality of single blocks are formed by connecting together in series, each having a SQUID ring and a trigger circuit, and a converter circuit adapted to convert the total weights calculated by the weighting circuits into quantized pulses. The second embodiment additionally includes: a positive side and a negative side; a positive lower inductor connected to the output of the weighting circuits on the positive side; a negative lower inductor connected to the output of the weighting circuits on the negative side; a positive upper inductor paired with the positive lower inductor; and a negative upper inductor paired with the negative lower inductor.

13 Claims, 4 Drawing Sheets

(56) References Cited

OTHER PUBLICATIONS

Figure 1:
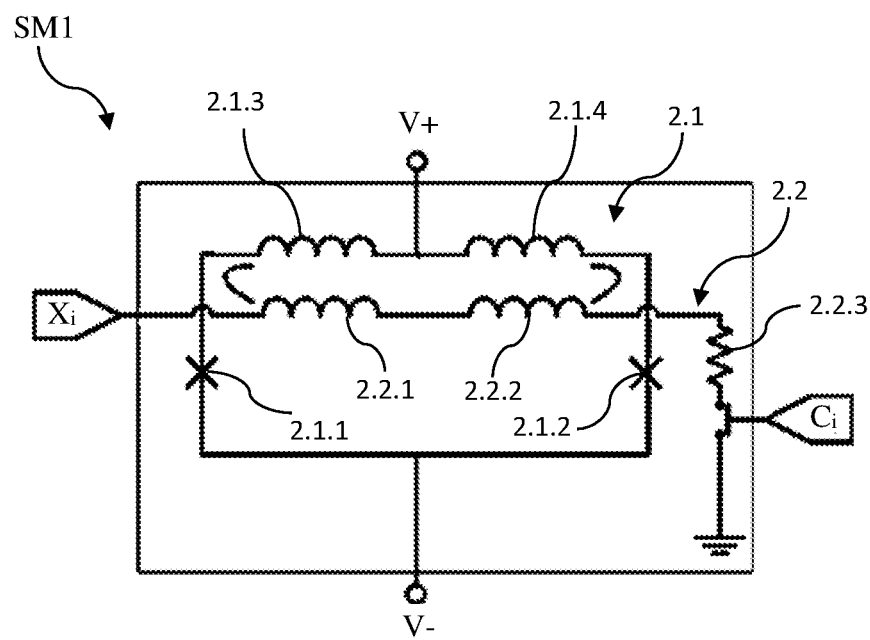

Merolla, et al. "A million spiking-neuron integrated circuit with a scalable communication network and interface", Science Aug. 8, 2014: vol. 345, Issue 6197, pp. 668-673, DOI: 10.1126/science.1254642.

Schneider et al. "Tutorial: High-speed low-power neuromorphic systems based on magnetic Josephson junctions", Journal of Applied Physics 124, 161102 (2018); https://doi.Org/10.1063/1.5042425.

ARTIFICIAL SYNAPSE CIRCUIT

TECHNICAL FIELD

The present invention relates to an artificial synapse circuit developed for use in artificial neural networks and artificial intelligence applications that require high performance.

PRIOR ART

Artificial intelligence is the general name given to the work, wherein, upon getting inspired by the behavioral patterns of all of the living creatures in nature, modeling systems that resemble these behaviors are constructed. Artificial intelligence is usually directed at analyzing humans' thinking methods and developing artificial instructions similar to them. In general, artificial intelligence is to enable the behaviors which are identified as intelligent when conducted by humans (intelligent behavior) to be performed by machines, or artificial intelligence is a theory showing how the human mind works. By means of artificial intelligence, it is aimed to make the machines more intelligent and useful. Artificial intelligence provides the machines with a number of functions like thinking, decision making, comparison and analysis such as the ones displayed by humans. Artificial intelligence has many applications such as expert systems, fuzzy logic, artificial neural networks, and genetic algorithms. Artificial neural networks (ANN) are logical software developed to perform, by mimicking the operation mechanism of the human brain, the basic functions of the brain such as learning, remembering and deriving new information by generalization. ANNs are synthetic structures that mimic the biological neural networks. The mimicked nerve cells contain neurons and these neurons connect to each other in various ways to form a network. These networks are capable of learning, storing in memory and revealing the relationship between data. Artificial neural networks are inspired by biological neurons (nerve cells), resulting in artificial simulation of the brain's working system. Artificial neural networks, such as the binding of many biological neurons in the human brain in general terms, are produced for realizing a whole process structure at various levels of activity of many simple and generally adaptive processing units (artificial neurons) which mimic the input, processing, and output characteristics of the biological neuron.

In the current art, artificial neural networks can be evaluated in 3 main categories. The first one is software, the second is semiconductor device based and the last one is superconductor device based. Significant progress has been made in software and semiconductor based artificial neural networks of the first and second categories, particularly in the stages of developing algorithms. But the most important problem of these systems is their slow operation and high-power consumption. Neuron circuits can be designed on software, but since too many algorithms work, the processes are carried out slowly. The problems with superconductor-based artificial nerve cells are that the circuits do not operate reliably, the single flux quantum (SFQ) is not compatible with the digital circuits, and that they are relatively complex structures having large areas. In the electronic application of artificial neural networks, there are integrated structures on the chip and these structures occupy a large area.

In the state of the art, artificial neural network application is also performed electronically with semiconductors. However, the operating speeds of semiconductor transistor or memristor based synapses are very slow (in the order of 10 Hz-1 kHz). For example, a neuromorphic processor disclosed by IBM operates at speeds of 20 Hz [1]. Superconductor-based synapses are made using magnetic Josephson junctions and their manufacturing technologies are very complex, identical and very difficult to produce a large number of junctions [2].

REFERENCES

[1] Paul A. Merolla, et al. "A million spiking-neuron integrated circuit with a scalable communication network and interface", Science 8 Aug. 2014: Vol. 345, Issue 6197, pp. 668-673, DOI: 10.1126/science.1254642

[2] Schneider et al. "Tutorial: High-speed low-power neuromorphic systems based on magnetic Josephson junctions", Journal of Applied Physics 124, 161102 (2018); https://doi.org/10.1063/1.5042425

OBJECTS OF THE INVENTION

The object of the present invention is to realize an artificial synapse circuit operating at firing rates in the order of GHz. A structure with this performance has not been previously produced for semiconductor and/or superconductor artificial neural networks.

Another object of the present invention is to realize an artificial synapse circuit that, when combined with an artificial neuron circuit, enables very high performance neuromorphic processors to be designed.

Another object of the present invention is to realize an artificial synapse circuit with low power consumption and low occupied space. Since the polarizing currents of the proposed synapses are series currents and contain a small number of Josephson junctions, both the power it consumes and the space it occupies are very small.

BRIEF DESCRIPTION OF THE INVENTION

The present invention relates to an artificial synapse circuit that is connected to the outputs of the sensors and enables the processing of data from the sensors. More specifically, the present invention relates to an artificial synapse circuit that enables the calculation of these weights in artificial neural networks containing inputs and neurons connected to neurons by weighting. The present invention is suitable for use in artificial neural networks and artificial intelligence applications that require high speed, for example in autonomous land, air and sea vehicles containing artificial neural networks.

An artificial synapse circuit realized to achieve the purpose of the present invention, defined in the first claim and other claims dependent on this claim, in its most basic form, comprises: a SQUID ring (Superconducting Quantum Interference Device Loop) including a first inductor, a second inductor, a first junction and a second junction; a trigger circuit comprising an input, a third inductor paired with the said first inductor, a fourth inductor paired with the said second inductor, a first resistor connected in series with the third inductor and the fourth inductor, and a switch, and when a signal comes from the input while the switch is in conduction state, ensuring that a portion of the current passing through the third inductor is transmitted to the first inductor and a portion of the current passing through the fourth inductor is transmitted to the second inductor, a plurality of weighting circuits in which a plurality of single blocks are formed by connecting together in series, each comprising a SQUID ring and a trigger circuit; an converter circuit adapted to convert the total weights calculated by the weighting circuits into quantized pulses.

The first junction and the second junction in the SQUID ring described in the first and second embodiments of the invention are Josephson junctions.

Weighting circuits are preferably formed by connecting two single blocks or four single blocks in series, but the invention is not limited to this, and by connecting different numbers of blocks together in series, weighting circuits of different structures can also be formed.

In the second embodiment of the invention, in addition to the first embodiment; a positive side and a negative side comprising a plurality of weighting circuits in which a plurality of single blocks are formed by connecting together in series, each comprising a SQUID ring and a trigger circuit; a positive lower inductor connected to the output of the weighting circuits on the positive side; a negative lower inductor connected to the output of the weighting circuits on the negative side; a positive upper inductor, which is paired with the positive lower inductor, and to which part of the current flowing through the positive lower inductor is transferred; a negative upper inductor, which is paired with the negative lower inductor, and to which part of the current flowing through the negative lower inductor is transferred; a converter circuit connected to the negative upper inductor and adapted to convert the total net weight calculated by the positive side and negative side weighting circuits into quantized pulses, are found.

In the second embodiment of the invention, the results of each of the weighting circuits connected in series on the positive and negative sides are collected separately on both sides. Since the positive lower inductor and the negative lower inductor are connected in series with each other, the difference between the total positive weights and the total negative weights is taken on the line where these two inductors are located, and this net weight is converted into quantized pulses in the converter circuit and given to the input of an artificial neuron circuit.

In the second embodiment of the invention, a first escape junction and a second escape junction are found between the positive lower inductor and the negative lower inductor. Thus, the effect of the positive side and the negative side on each other is reduced. A current source is found between these two escape junctions. Therefore, current is provided to pass through the SQUID rings. Also, in the second embodiment of the invention, a second resistor connected between ground and positive lower inductor, a third resistor connected between ground and negative lower inductor, and a matching impedance connected between ground and positive upper inductor are connected.

DETAILED DESCRIPTION OF THE INVENTION

The artificial synapse circuit developed to fulfill the objects of the present invention is illustrated in the accompanying figures, in which:

FIG. 1. Schematic view of a single block containing the SQUID ring and the trigger circuit.

Figure 2:
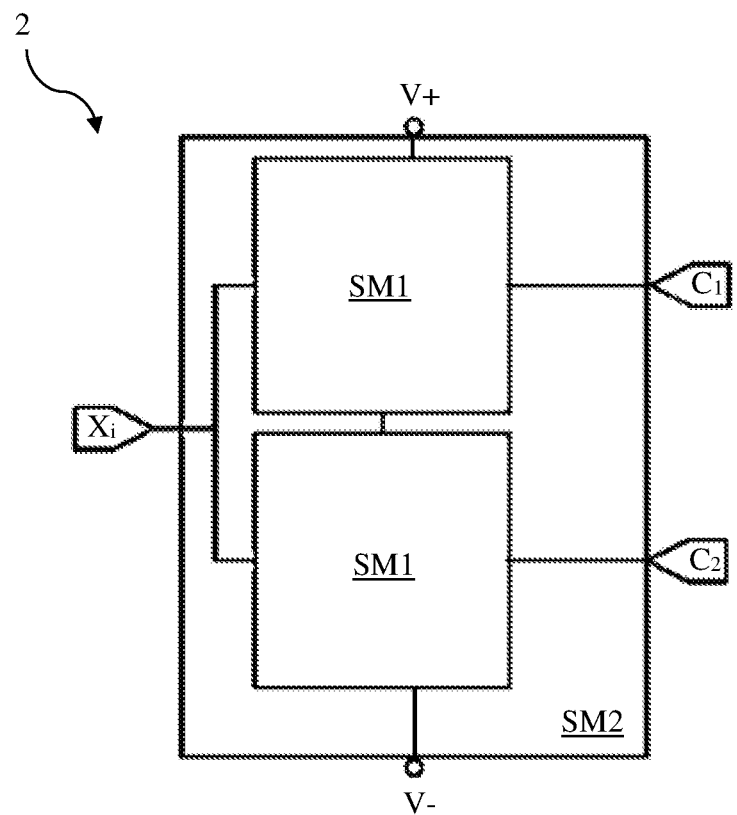

FIG. 2. This is the schematic view of a weighting circuit containing a binary block in which two single blocks are connected in series.

Figure 3:
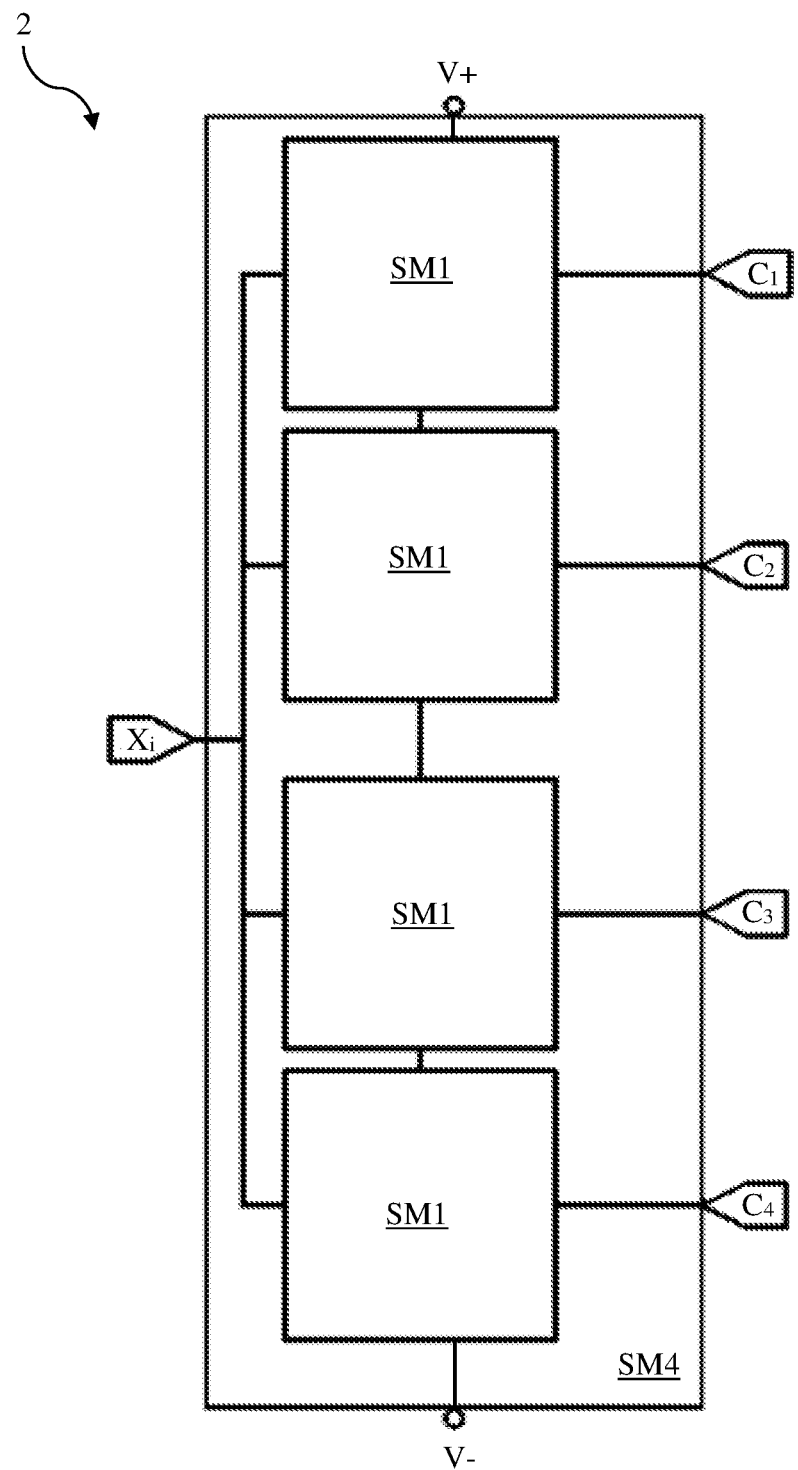

FIG. 3. This is the schematic view of a weighting circuit that includes a quad block in which four single blocks are connected in series.

Figure 4:
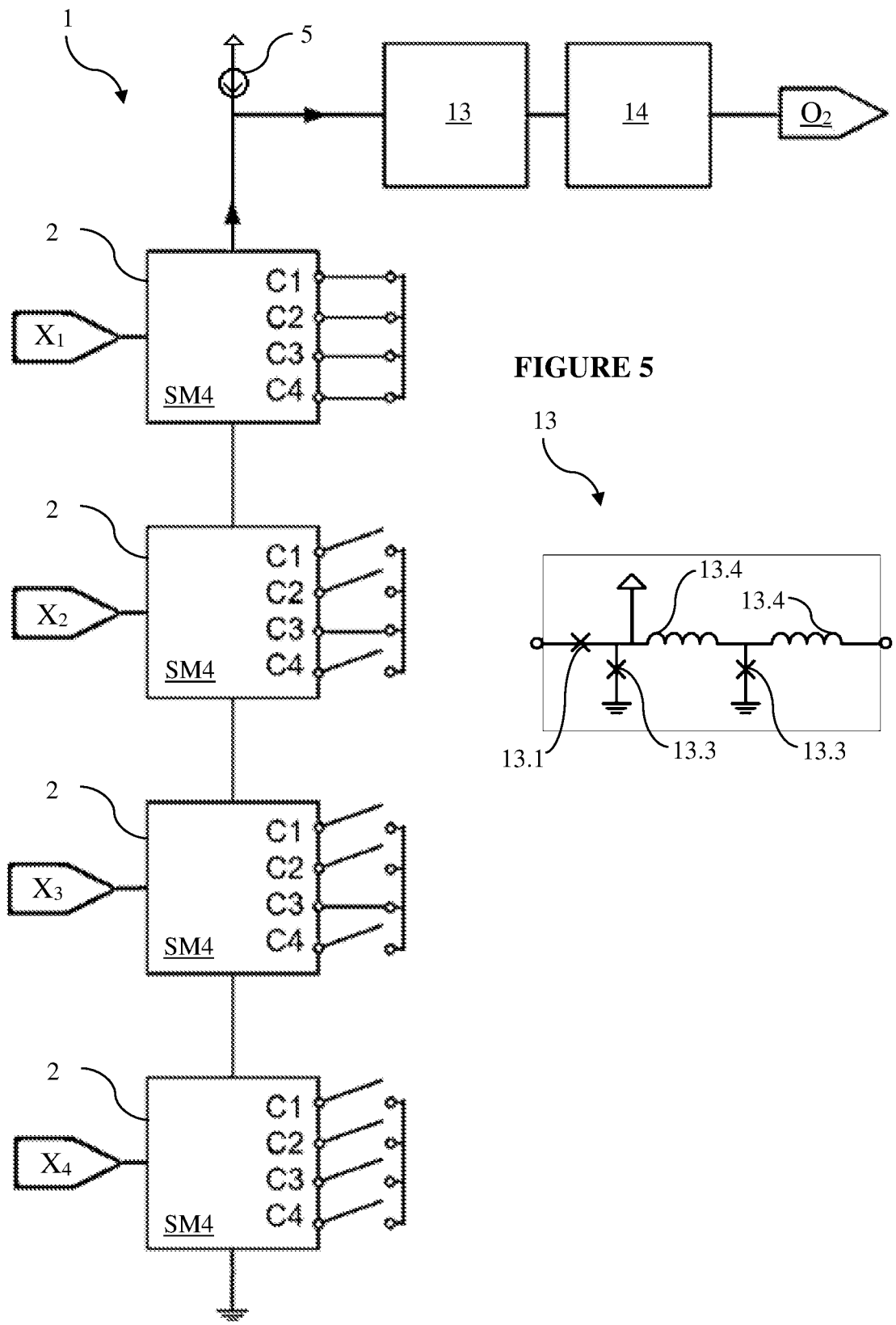

FIG. 4. This is the circuit diagram of the artificial synapse circuit of the first embodiment of the invention.

Figure 5:
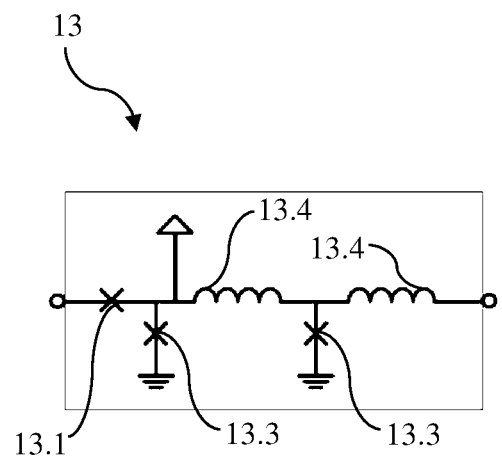

FIG. 5. This is the circuit diagram of the converter circuit used in the first and second embodiments of the invention.

Figure 6:
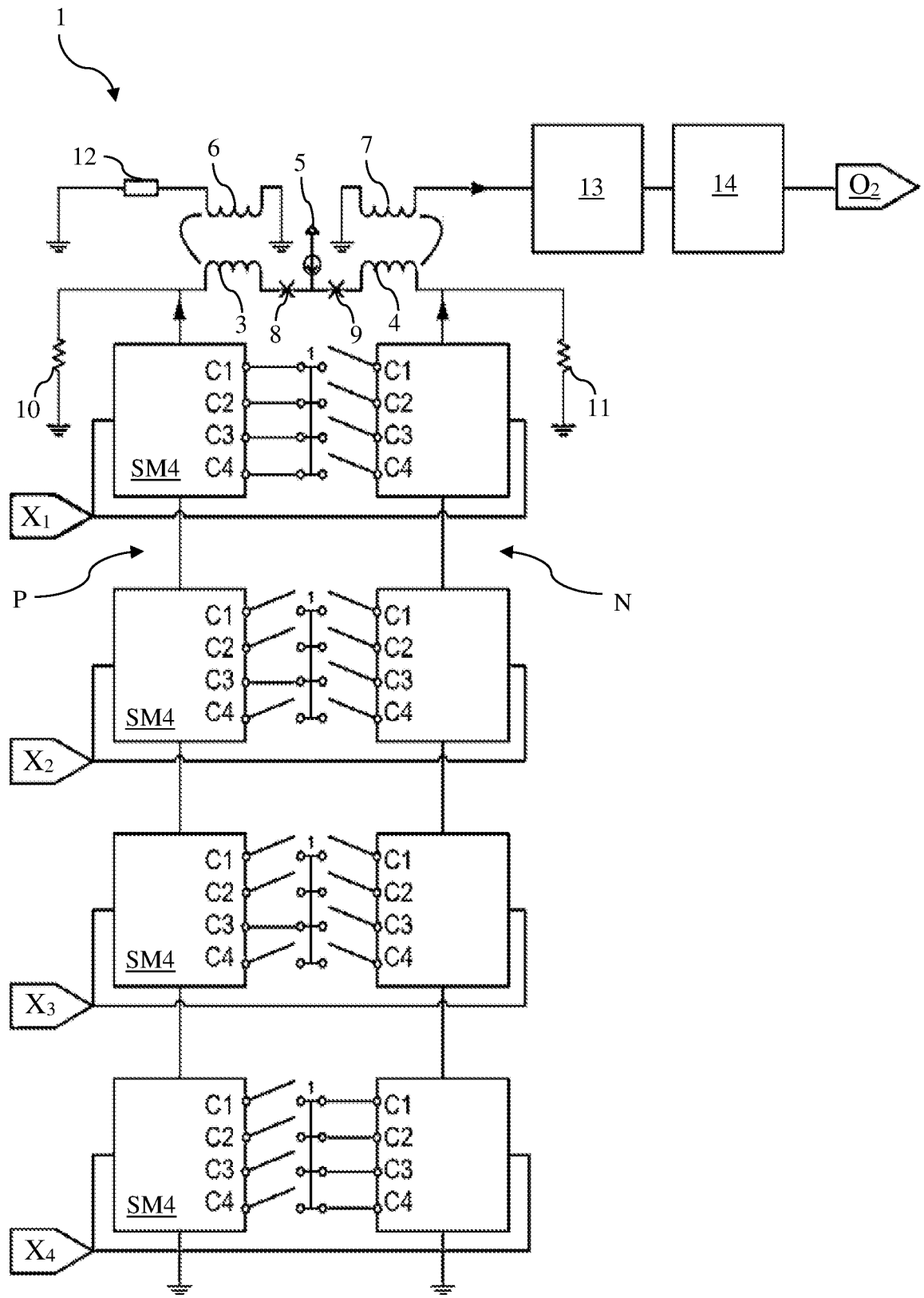

FIG. 6. This is the circuit diagram of the artificial synapse circuit of the second embodiment of the invention.

The components given in the figures are enumerated individually, and the meanings of these numbers are given below.

1. Artificial synapse circuit
2. Weighting circuit
   2.1. SQUID ring
      2.1.1. First junction
      2.1.2. Second junction
      2.1.3. First inductor
      2.1.4. Second inductor
   2.2. Trigger circuit
      2.2.1. Third inductor
      2.2.2. Fourth inductor
      2.2.3. First resistor
3. Positive sub inductor
4. Negative sub inductor
5. Current source
6. Positive top inductor
7. Negative top inductor
8. First escape junction
9. Second escape junction
10. Second resistor
11. Third resistor
12. Pairing impedance
13. Inverter circuit
   13.1. Third junction
   13.2. Fourth junction
   13.3. Fifth junction
   13.4. Fifth inductor
   13.5. Sixth inductor
14. Artificial neuron circuit
$X_i$. Input
$X_1$. First input
$X_2$. Second input
$X_3$. Third input
$X_4$. Fourth input
$C_i$. Switch
$C_1$. First switch
$C_2$. Second switch
$C_3$. Third switch
$C_4$. Fourth switch
SM1. Single block
SM2. Binary block
SM4. Quad block
P. Positive side
N. Negative side
V+. First point
V−. Second point
$O_2$. Neuron output The artificial synapse circuit (1) of the invention has two different applications, and the first preferred application of the invention, in its most basic form, comprises:

a SQUID ring (2.1) comprising a first junction (2.1.1), a second junction (2.1.2), a first inductor (2.1.3) and a second inductor (2.1.4), a trigger circuit (2.2) comprising an input ($X_i$), a third inductor (2.2.1) paired with the first inductor (2.1.3), a fourth inductor (2.2.2) paired with the second inductor (2.1.4), a first resistor (2.2.3) connected in series with the third inductor (2.2.1) and the fourth inductor (2.2.2), and a switch ($C_i$), and when a signal comes from the input ($C_i$) while the switch ($C_i$) is in conduction state, ensuring that a portion of the current passing through the third inductor (2.2.1) is transmitted to the first inductor (2.1.3) and a portion of the current passing through the fourth inductor (2.2.2) is transmitted to the second inductor (2.1.4), a plurality of weighting circuits (2) in which a plurality of single blocks (SM1) are formed by connecting together in series, each comprising a SQUID ring (2.1) and a trigger circuit (2.2);

a converter circuit (13) connected to the output of a plurality of weighting circuit (2) structure connected in series, adapted to convert the total weights calculated by the weighting circuits (2) into quantized pulses.

In FIG. 1, the circuit diagram of a single block (SM1) comprising a SQUID ring (2.1) and a trigger circuit (2.2) for providing external input ($X_i$) to this SQUID ring (2.1) is shown. The SQUID ring (2.1) in the single block (SM1), in its most basic form, comprises: a first inductor (2.1.3), a second inductor (2.1.4), a first junction (2.1.1) and a second junction (2.1.2). The said first junction (2.1.1) and the second junction (2.1.2) are preferably Josephson junctions. Flux quanta can be formed by the first inductor (2.1.3), the second inductor (2.1.4), the first junction (2.1.1) and the second junction (2.1.2) in the SQUID ring (2.1).

The trigger circuit (2.2) in the single block (SM1) comprises an input ($X_i$), a third inductor (2.2.1), a fourth inductor (2.2.2), a first resistor (2.2.3) and a switch ($C_i$), which are connected in series with each other. The said switch ($C_i$) is preferably connected between the first resistor (2.2.3) and ground. The said input ($X_i$) is data to be processed (e.g. in the form of a square wave signal), preferably coming from the outside world (e.g. from a sensor). The said third inductor (2.2.1) and fourth inductor (2.2.2) are paired with the first inductor (2.1.3) and the second inductor (2.1.4), respectively, which are located in the SQUID ring (2.1). When an input ($X_i$) is entered into the trigger circuit (2.2) from outside, and if the switch ($C_i$) found on the trigger circuit (2.2) is in conduction state, a current flows towards the ground through the third inductor (2.2.1), fourth inductor (2.2.2) and first resistor (2.2.3). In this case, a portion of the current passing through the third inductor (2.2.1) is transferred to the first inductor (2.1.3) paired with this third inductor (2.2.1), and a portion of the current passing through the fourth inductor (2.2.2) is transferred to the second inductor (2.1.4) paired with this fourth inductor (2.2.2). In other words, when a signal is given to the trigger circuit (2.2) through its input ($X_i$), this signal is transferred to the SQUID ring (2.1) via the trigger circuit (2.2). Therefore, the first junction (2.1.1) and the second junction (2.1.2), forms a potential between a first point (V+) between the first inductor (2.1.3) and the second inductor (2.1.4) and a second point (V−) between the first junction (2.1.1) and the second junction (2.1.2).

When two single blocks (SM1), shown in FIG. 1, each containing a SQUID ring (2.1) and a trigger circuit (2.2) are connected in series with each other, a weighting circuit (2) comprising a binary block (SM2) as shown in FIG. 2 emerges. In the weighting circuit (2) in FIG. 2, the number of input ($X_i$) or weight value (W) in FIG. 2 may vary depending on the selection of the first switch ($C_1$) and the second switch ($C_2$) being on or off. For example, if the first switch ($C_1$) is "0" and the second switch ($C_2$) is "1", it means that there is one input ($X_i$) here, and the weight is "1". For example, if the first switch ($C_1$) is "1" and the second switch ($C_2$) is "1", it means that there is one input ($X_i$) here, and the weight is "2". These results are obtained according to a table arranged according to a previously created artificial neural network. An exemplary Table 1 is given below (artificial neural network is not shown in the figures). However, this invention is not limited to Table 1, and the values of "0", "1" and "2" in this table may differ for different applications.

TABLE 1

| C1 | C2 | W | X |
|----|----|---|---|
| 0  | 1  | 1 | 1 |
| 1  | 1  | 2 | 1 |

A weighting circuit (2) consisting of a quad block (SM4) formed by connecting four of the single blocks (SM1) shown in FIG. 1 is shown in FIG. 3. However, the weighting circuits (2) disclosed in the invention are not limited to the serial connection of two binary blocks (SM2) or four single blocks (SM1), but different numbers of blocks (e.g. single block (SM1), binary block (SM2), quad block (SM4) . . . ) can be formed by connecting different numbers of combinations in series so as to form weighting circuits (2) with different structures.

In the weighting circuit (2) shown in FIG. 3, by means of controlling the first switch ($C_1$), the second switch ($C_2$), the third switch ($C_3$) and the fourth switch ($C_4$), the weight (W) at the output of this weighting circuit (2) can be selected as "0", "1", or "2", and also the input ($X_i$) numbers can be selected as "0", "1", or "2". Thus, these weighting circuits (2) enable the calculation of the weights connected to said neurons in an artificial neural network (the aforementioned neurons and artificial neural network are not shown in the figures).

In the weighting circuit (2) shown in FIG. 3, the decision on which of the SQUID loop(s) (2.1) will be active or passive, or in other words, will be used or not, depends on whether the first switch ($C_1$), the second switch ($C_2$), the third switch ($C_3$), and the fourth switch ($C_4$) are open or closed. Because, as stated before, whichever switch ($C_i$) is in conduction (closed) state, current flows through the trigger circuit (2.2) that is connected to that switch ($C_i$). When the switch ($C_i$) is in conducting state and the current applied on the third inductor (2.2.1) and the fourth inductor (2.2.2) are above a certain threshold value, an output (potential) in the form of a square wave is formed between the first point (V+) and the second point (V−) of the SQUID ring (2.1). Whichever switch ($C_i$) is open (not in transmission), no current flows through the trigger circuit (2.2) where that open switch (Ci) is located. Therefore, the third inductor (2.2.1) and the fourth inductor (2.2.2) found on the trigger circuit (2.2) through which current is not passing, do not transfer any current to the first inductor (2.1.3) and the second inductor (2.1.4) on the SQUID ring (2.1) with which they are paired, and no output (potential) is formed between the first point (V+) and the second point (V−). Therefore, weighting is done or not done by the weighting circuit (2) by opening and closing this first switch ($C_1$), second switch ($C_2$), third switch ($C_3$) and fourth switch ($C_4$) according to the values of the weights entering the neurons in a predetermined neural network. Normally, the voltage that each SQUID ring (2.1) can generate is "1" quanta, i.e. "1" pulse. However, when single block (SM1) structures containing SQUID rings (2.1) and trigger circuits (2.2) are connected in series to each other, "2" pulse or a voltage of "2" pulse can be generated. Thus, weighting is done by means of the weighting circuits (2).

If four of the weighting circuits (2) containing four blocks (SM4) shown in FIG. 3 are connected in series, the structure shown in FIG. 4 is obtained. In FIG. 4, as an example, a structure formed of weighting circuits (2) connected to each other in series and comprising four quad blocks (SM4) is shown, but the invention is not limited to weighting circuits (2) being connected to each other in series and comprising four quad blocks (SM4), and different circuit structures can be formed by serial connection of different numbers of weighting circuits (2) comprising quad block (SM4) and/or blocks with different numbers than four (for example, binary block (SM2), singular block (SM1) etc.).

In this embodiment of the present invention, a current source (5) is found, which supplies the current required for ensuring the current to flow over the SQUID rings (2.1). The said current source (5) is preferably connected to the output of the weighting circuits (2).

In the artificial synapse circuit (1) shown in FIG. 4, the switches ($C_i$) that are in conduction (closed) state are given the value of "1", and "0" is given to the non-transmitting (open) switches ($C_i$). For example, if we look at the weighting circuit (2) corresponding to the line where the first input ($X_i$) is found, when the first switch ($C_1$), the second switch ($C_2$), the third switch ($C_3$), and the fourth switch ($C_4$) are all closed, or in other words, these switches ($C_i$) are in conduction state, the weight formed at the output of the weighting circuit (2) herein is: "2×2=4". The first value of "2" represents the weight and the other value of "2" represents that there are two inputs (Table 2). When looking at the part where the second input ($X_2$) is located in FIG. 4, only the third switch ($C_3$) is weighted here. Weighting only the third switch ($C_3$) means that the weight (W) is "1" and the input (X) is "1" according to Table 2. Here, if only the first switch ($C_1$) and the second switch ($C_2$) were closed, then the weight (W) according to Table 1 would be "2" and the input (X) would be "1". The said numbers are determined according to a table prepared according to a predetermined artificial neural network. As an example, a pre-prepared Table 2 is shown below. However, the invention is not limited to the numbers shown in Table 2, and varies according to different applications.

TABLE 2

| C1 | C2 | C3 | C4 | W | X |
|---|---|---|---|---|---|
| 0 | 0 | 0 | 0 | 0 | 0 |
| 0 | 0 | 1 | 0 | 1 | 1 |
| 1 | 1 | 0 | 0 | 2 | 1 |
| 0 | 0 | 1 | 1 | 1 | 2 |
| 1 | 1 | 1 | 1 | 2 | 2 |

Since the said weighting circuits (2) are connected in series to each other, the outputs of these circuits are added together. For example, "4" comes from the weighting circuit (2) where the first input ($X_1$) is found, "1" comes from the weighting circuit (2) where the second input ($X_2$) is found, "1" comes from the weighting circuit (2) where the third input ($X_3$) is found, "0" comes from the weighting circuit (2) where the fourth input ($X_4$) is found, and these weights are summed up and thus the weight value "6" is calculated. Here, no weight value is obtained from the last weighting circuit (2) where the fourth input ($X_4$) is located, because the first switch ($C_1$), second switch ($C_2$), third switch ($C_3$) and fourth switch ($C_4$) are all open.

When the outputs of the weighting circuits (2) are added together, this total weight value enters the converter circuit (13). The converter circuit (13) shown in FIG. is a standard buffer quantizer circuit comprising a third junction (13.1), a fourth junction (13.2), a fifth junction (13.3), a fifth inductor (13.4) and a sixth inductor (13.5). This converter circuit (13) is a circuit that harmonizes the output of the weighting circuit (2) with the input of the artificial neuron circuit (14). In other words, when a non-quantized analog signal is input to the converter circuit (13), this analog signal comes out of the converter circuit (13) in a quantized way, that is, as a pulse. The more units of weight enter the converter circuit (13), the more unit number of pulses are generated at its output. For example, when a weight (current or voltage in a square wave form with a unit amplitude) enters the converter circuit (13), one pulse is output at its output, and two pulses are produced at its output when two weights (current or voltage in a square wave form of two unit amplitude) enter. In the example given in FIG. 4, since the total net weight at the outputs of the weighting circuits (2) is calculated as "6" (4+1+1+0), a total of "6" pulses will be generated at the output of the converter circuit (13).

These pulses at the output of the converter circuit (13) enter an artificial neuron circuit (14) and are processed here and an output is produced. This output can be the input of another weighting circuit (2) or it can be a result.

In FIG. 6, the second preferred application of the artificial synapse circuit (1) of the invention is shown. This embodiment of the invention includes all the features of the first embodiment of the invention, and also has some additional features. These additional features are detailed in the following paragraphs.

The artificial synapse circuit (1) of the invention has two different applications, and the first preferred application of the invention, in its most basic form, comprises:
- a SQUID ring (2.1) comprising a first inductor (2.1.3), a second inductor (2.1.4), a first junction (2.1.1) and a second junction (2.1.2),
- a trigger circuit (2.2) comprising an input ($X_i$), a third inductor (2.2.1) paired with the first inductor (2.1.3), a fourth inductor (2.2.2) paired with the second inductor (2.1.4), a first resistor (2.2.3) connected in series with the third inductor (2.2.1) and the fourth inductor (2.2.2), and a switch ($C_i$), and when a signal comes from the input ($C_i$) while the switch ($C_i$) is in conduction state, ensuring that a portion of the current passing through the third inductor (2.2.1) is transmitted to the first inductor (2.1.3) and a portion of the current passing through the fourth inductor (2.2.2) is transmitted to the second inductor (2.1.4),
- at least one positive side (P) and at least one negative side (N) comprising a plurality of weighting circuits (2) in which a plurality of single blocks (SM1) are formed by connecting together in series, each comprising a SQUID ring (2.1) and a trigger circuit (2.2);
- a positive lower inductor (3) connected to the output of the weighting circuits (2) on the positive side (P),
- a negative lower inductor (4) connected to the output of the weighting circuits (2) on the negative side (N),
- a positive upper inductor (6) paired with the positive lower inductor (3) and to which part of the current flowing through the positive lower inductor (3) is transferred,
- a negative upper inductor (7) paired with the negative lower inductor (4) and to which part of the current flowing through the negative lower inductor (4) is transferred,
- a current source (5) located between the negative lower inductor (4) and the positive lower inductor (3), a converter circuit (13) connected to the negative upper inductor (7), adapted to convert the total net weight calculated by the positive side (P) and negative side (N) weighting circuits (2) into quantized pulses.

In this second preferred embodiment of the invention, the weighting circuits (2), which are connected in series, are placed against each other as the positive side (P) and the negative side (N). Each of the weighting circuits (2) connected in series to each other in the positive side (P) and the negative side (N) comprise more than one switches ($C_i$) as in the first embodiment, and the weighting operation is performed as a result of opening and closing of these switches ($C_i$) according to a table arranged according to a pre-prepared artificial neural network. Since these weighting circuits (2) are connected in series, the results of each of the weighting circuits (2) on the positive side (P) are collected at the output of these weighting circuits (2) ($\Sigma_P$). Likewise, the results of each of the weighting circuits (2) on the negative side (N) are collected at the output of these weighting circuits (2) ($\Sigma_N$).

The output of the weighting circuits (2) on the positive side (P) is connected between a second resistor (10) connected to a ground and a positive lower inductor (3). The output of the weighting circuits (2) on the negative side (N) is connected between a third resistor (11) connected to a ground and a negative lower inductor (4).

There is also a first escape junction (8) and a second escape junction (9) between the positive lower inductor (3) and the negative lower inductor (4). The first escape junction (8) and the second escape junction (9) enable the artificial synapse circuit (1) to operate more stably by preventing the positive side (P) and the negative side (N) from affecting each other. Between the first escape junction (8) and the second escape junction (9), a current source (5) is found to generate bias current. This current source (5) provides the current required for the current to pass through the SQUID rings (2.1).

In SQUID rings (2.1) shown in FIG. 1, there are only inductors and Josephson junctions, and since they are all superconducting, they have no losses. Therefore, when an entry comes from an input ($X_i$), that entry remains in this weighting circuit (2) and does not allow new entries to come. To prevent this, a second resistor (10) is placed between the ground and the positive lower inductor (3) and a third resistor (11) is placed between the ground and the negative lower inductor (4). Thus, the flux/energy on the superconducting line in the SQUID ring (2.1) is discharged to the ground. In other words, it is ensured that the energy on the line consisting of this superconducting inductor and Josephson junction in the SQUID ring (2.1) can be transmitted to the ground and the circuit is ready for the next entry.

In the artificial synapse circuit (1) shown in FIG. 6, there is a positive upper inductor (6) paired with the positive lower inductor (3). This positive top inductor (6) is connected to a matching impedance (12) connected to a ground at one end and to the ground at the other end. When a current flows through the said positive lower inductor (3), a part of this current is transferred to the positive upper inductor (6) which is paired with the positive lower inductor (3) and this transferred current flows to the ground through the matching impedance (12).

There is also a negative upper inductor (7) paired with the negative lower inductor (4) in the artificial synapse circuit (1). One end of this negative upper inductor (7) is connected to the ground and the other end is connected to the converter circuit (13). When a current flows through the said negative lower inductor (4), a part of this current is transferred to the negative upper inductor (7) which is paired with the negative lower inductor (4) and this transferred current flows towards the converter circuit (13).

The current from the positive side (P) weighting circuits (2) and the current at the output of the weighting circuits (2) on the negative side (N) flow towards each other. Therefore, in the line between the said positive lower inductor (3) and the negative lower inductor (4), the difference between the total weight at the output of the weighting circuits (2) found at the said positive side (P) and the total weight at the output of the weighting circuits (2) found at the negative side (N) are taken so as to obtain the total net weight ($\Sigma_P - \Sigma_N$). For example, when the flux quanta coming from the weighting circuits (2) in the positive side (P) are added to each other as currents on the positive lower inductor (3), and the total weight value herein is: "$\Sigma_P = 2X_1 + X_2 + X_3 = 2 \times 2 + 1 + 1 = 6$"; and when the flux quanta coming from the weighting circuits (2) in the negative side (N) are added to each other as currents on the negative lower inductor (4), and the total weight value herein is: "$\Sigma_N = 2X_4 = 2 \times 2 = 4$"; then the total net weight on the negative upper inductor (7) is: "$\Sigma_P - \Sigma_N = 6 - 4 = 2$".

Here, when the total net weight "2" enters the converter circuit (13), it will appear as "2" pulses at the output of this converter circuit (13) and these pulses will enter the artificial neuron circuit (14). After processing this artificial neuron circuit (14), it may enter the input ($X_i$) of another weighting circuit (2), or it may be the result of the artificial synapse circuit (1). In other words, if the neuron output ($O_2$) of the artificial neuron circuit (14) is in the hidden layer in an artificial neural network, the neuron output ($O_2$) may be the input ($X_i$) of another weighting circuit (2). If the neuron output ($O_2$) of this artificial neuron circuit (14) is in the output layer in the artificial neural network, then it can give a result (for example the genus of a flower).

The working principle of the first application and the second application of the invention is as follows: At least one or more of the first input ($X_1$), the second input ($X_2$), the third input ($X_3$), and the fourth input ($X_4$) from the outside world are received as entries. If the switch ($C_i$) in the trigger circuit (2.2) is in transmission state, these entries taken from the input ($X_i$) of the trigger circuit (2.2) pass through the third inductor (2.2.1), the fourth inductor (2.2.2) and the first resistor (2.2.3), respectively, and a current flows into the ground. Meanwhile, while the current passes through the third inductor (2.2.1), some of this current is transferred to the first inductor (2.1.3) which is paired with this third inductor (2.2.1). Likewise, while the current passes through the fourth inductor (2.2.2), some of this current is transferred to the second inductor (2.1.4). In other words, the data at the input ($X_i$) of the trigger circuit (2.2) is transferred to the SQUID ring (2.1) and thus a potential occurs between the first point (V+) and the second point (V−) in the SQUID ring (2.1).

These entries taken from the input ($X_i$) of the trigger circuit (2.2) are weighted by the weighting circuits (2) in which multiple single blocks (SM1), each containing a SQUID ring (2.1) and trigger circuit (2.2), are connected in series. This weighting process is performed by opening and closing the first switch ($C_1$), the second switch ($C_2$), the third switch ($C_3$) and the fourth switch ($C_4$) accordingly. How the first switch (C1), second switch (C2), third switch (C3) and fourth switch (C4) will be turned on and off is performed according to a table arranged according to a pre-prepared artificial neural network (Tables 1-2). The information of the weights here is obtained from the previously determined artificial neural network design and entered in the relevant table.

In the artificial synapse circuit (1) described in the first embodiment of the invention shown in FIG. 4, weights (since the weighting circuits (2) are connected in series) are collected at the output of these weighting circuits (2). Then, when these weights are added together, an analog current occurs due to these weights. This analog current enters the converter circuit (13). The more the number of units of signal are entered into the converter circuit (13), the more unit number of pulses are obtained from its output. If the artificial neuron circuit (14) receives an appropriate number of pulses, a neuron output ($O_2$) is created. This neuron output ($O_2$) could be the result of the circuit, or it could be an output driving the next artificial neuron circuit (14).

In the artificial synapse circuit (1) described in the second embodiment of the invention shown in FIG. 6, the total weight at the output of the weighting circuits (2) is not directly transmitted to the converter circuit (13). In this second embodiment of the invention, the weights on the positive side (P) and the weights on the negative side (N) are added together separately. In other words, the weights on the positive side (P) are collected on the positive lower inductor (3), and the weights on the negative side (N) on the negative lower inductor (4). Then, when the positive weights are added ($\Sigma_P$), an analog current is generated due to these positive weights. Likewise, when the negative weights are added ($\Sigma_N$), an analog current is generated due to these negative weights. Since the positive lower inductor (3) and the negative lower inductor (4) are connected in series to each other, a subtraction operation ($\Sigma_P - \Sigma_N$) is performed between these two analog currents on both the positive side (P) and the negative side (N).

The net current on the negative lower inductor (4), which is proportional to the difference between the positive weights and the negative weights, is transferred with a certain coefficient to the negative upper inductor (7) coupled to the negative lower inductor (4). Then, this transferred analog current is entered into the converter circuit (13). The more the number of units of current is entered into the converter circuit (13), the more unit number of pulses are obtained from its output. For example, if a one-unit analog signal enters the converter circuit (13), one pulse is output at its output, and if a two-unit analog signal enters, two pulses are output and enter the artificial neuron circuit (14). If the artificial neuron circuit (14) receives an appropriate number of pulses, an output ($O_2$) is generated. This output ($O_2$) could be the result of the circuit, or it could be an output driving the next artificial neuron circuit (14).

The invention claimed is:

1. An artificial synapse circuit comprising:
a SQUID ring (Superconducting Quantum Interference Device Loop) comprising a first junction, a second junction, a first inductor and a second inductor;
a trigger circuit comprising an input, a third inductor paired with the first inductor, a fourth inductor paired with the second inductor, a first resistor connected in series with the third inductor and the fourth inductor, and a switch, and when a signal comes from the input while the switch is in conduction state, ensuring that a portion of the current passing through the third inductor is transmitted to the first inductor and a portion of the current passing through the fourth inductor is transmitted to the second inductor;
a plurality of weighting circuits in which a plurality of single blocks are formed by connecting together in series, each comprising a SQUID ring and a trigger circuit; and
a converter circuit adapted to convert the total weights calculated by the weighting circuits into quantized pulses.

2. The artificial synapse circuit according to claim 1, wherein the first junction and the second junction are Josephson junctions.

3. The artificial synapse circuit according to claim 1, wherein a weighting circuit is formed by connecting two single blocks in series with each other, each comprising a SQUID ring and a trigger circuit.

4. The artificial synapse circuit according to claim 1, wherein a weighting circuit is formed by connecting four single blocks in series with each other, each comprising a SQUID ring and a trigger circuit.

5. The artificial synapse circuit according to claim 1, wherein a current source is connected to the output of the weighting circuits.

6. The artificial synapse circuit according to claim 1, wherein the converter circuit is connected to the output of the weighting circuits.

7. The artificial synapse circuit according to claim 1, wherein a positive side and a negative side comprise a plurality of weighting circuits in which a plurality of single blocks, each comprising a SQUID ring and a trigger circuit, are formed by being connected together in series; a positive lower inductor-connected to the output of the weighting circuits on the positive side; a negative lower inductor connected to the output of the weighting circuits on the negative side; a positive upper inductor, which is paired with the positive lower inductor, and to which part of the current flowing through the positive lower inductor is transferred; a negative upper inductor, which is paired with the negative lower inductor, and to which part of the current flowing through the negative lower inductor is transferred; a converter circuit connected to the negative upper inductor and adapted to convert the total net weight calculated by the positive side and negative side weighting circuits into quantized pulses.

8. The artificial synapse circuit according to claim 7, characterized by the positive side and the negative side, where the results of each of the weighting circuits connected in series on each side are collected separately.

9. The artificial synapse circuit according to claim 8, wherein the positive lower inductor and a negative lower inductor are connected in series on a line in order to obtain the difference between the total weight on the positive side and the total weight on the negative side.

10. The artificial synapse circuit according to claim 7, comprising a first escape junction and a second escape junction-located between the positive lower inductor and the negative lower inductor.

11. The artificial synapse circuit according to claim 10, wherein a current source is located between the first escape junction and the second escape junction.

12. The artificial synapse circuit according to claim 7, comprising a second resistor connected between the ground and the positive lower inductor and a third resistor connected between the ground and the negative lower inductor.

13. The artificial synapse circuit according to claim 7, comprising a pairing impedance connected between the ground and the positive upper inductor.

* * * * *